United States Patent
Testino et al.

(10) Patent No.: US 9,583,268 B2
(45) Date of Patent: Feb. 28, 2017

(54) CERAMIC MULTI-LAYER CAPACITOR BASED ON BATI(1-Y)ZRYO3

(71) Applicant: EPCOS AG, München (DE)

(72) Inventors: Andrea Testino, Wuerenlingen (CH); Michael Schossmann, Deutschlandsberg (AT); Markus Koini, Seiersberg (AT); Markus Ortner, Wettmannstätten (AT); Günter Engel, Leibnitz (AT); Christian Hoffmann, München (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 14/912,272

(22) PCT Filed: Sep. 1, 2014

(86) PCT No.: PCT/EP2014/068516
§ 371 (c)(1),
(2) Date: Feb. 16, 2016

(87) PCT Pub. No.: WO2015/049081
PCT Pub. Date: Apr. 9, 2015

(65) Prior Publication Data
US 2016/0203912 A1 Jul. 14, 2016

(30) Foreign Application Priority Data
Oct. 2, 2013 (DE) .................. 10 2013 110 978

(51) Int. Cl.
*C04B 35/48* (2006.01)
*H01G 4/30* (2006.01)
(Continued)

(52) U.S. Cl.
CPC ............... *H01G 4/30* (2013.01); *C04B 35/49* (2013.01); *H01G 4/008* (2013.01); *H01G 4/012* (2013.01);
(Continued)

(58) Field of Classification Search
CPC .... C04B 35/468; C04B 35/4682; C04B 35/48
See application file for complete search history.

(56) References Cited

U.S. PATENT DOCUMENTS 6,579,600 B1 * 6/2003 Bowen ............... H01G 4/30
428/192
6,620,755 B2 * 9/2003 Saito ............... B32B 18/00
361/321.4

(Continued)

FOREIGN PATENT DOCUMENTS

JP 2002284572 A 10/2002
JP 2009035431 A 2/2009

OTHER PUBLICATIONS

Mahajan, S., et al., "Study of Structural and Electrical Properties of Conventional Furnace and Microwave-Sintered BaZr0.10Ti0.90O3 Ceramics", J. Am. Ceram. Soc., 92(2), Feb. 2009, pp. 416-423.

(Continued)

*Primary Examiner* — Noah Wiese
(74) *Attorney, Agent, or Firm* — Slater Matsil, LLP

(57) ABSTRACT

A ceramic multi-layer capacitor is disclosed. In an embodiment, the capacitor includes a main body having ceramic layers and first and second electrode layers arranged therebetween, wherein the ceramic layers includes a ceramic material on the basis of $BaTi_{1-y}Zr_yO_3$ where $0 \leq y \leq 1$, which has a temperature-dependent capacitance anomaly.

22 Claims, 3 Drawing Sheets

(51) Int. Cl.
*H01G 4/008* (2006.01)
*H01G 4/012* (2006.01)
*H01G 4/12* (2006.01)
*C04B 35/49* (2006.01)

(52) U.S. Cl.
CPC ... *H01G 4/1227* (2013.01); *C04B 2235/3215* (2013.01); *H01G 4/1245* (2013.01)

(56) References Cited

U.S. PATENT DOCUMENTS

| | | | |
|---|---|---|---|
| 6,809,052 B2* | 10/2004 | Horie | C01G 23/003 252/62.3 BT |
| 2013/0083450 A1* | 4/2013 | Yoon | H01G 4/30 361/321.4 |
| 2013/0107417 A1* | 5/2013 | Cho | H01G 4/30 361/301.4 |

OTHER PUBLICATIONS

Qi, J. Q., et al., "Dielectric properties of barium zirconate titanate (BZT) ceramics tailored by different donors for high voltage applications", Solid State Sciences 14, Aug. 2012, pp. 1520-1524.

* cited by examiner

CERAMIC MULTI-LAYER CAPACITOR BASED ON BATI(1-Y)ZRYO3

This patent application is a national phase filing under section 371 of PCT/EP2014/068516, filed Sep. 1, 2014, which claims the priority of German patent application 10 2013 110 978.0, filed Oct. 2, 2013, each of which is incorporated herein by reference in its entirety.

TECHNICAL FIELD

A ceramic multi-layer capacitor is specified which is preferably suitable for high-power applications. The multi-layer capacitor can be used, for example, as a filter element in the case of an AC/DC or DC/DC converter having a high power density.

SUMMARY

Embodiments of the invention specify a ceramic multi-layer capacitor which has improved properties in comparison with known multi-layer capacitors.

In accordance with at least one embodiment, a ceramic multi-layer capacitor comprises a main body. Preferably, the main body has a parallelepipedal shape. The main body comprises dielectric layers arranged along a stacking direction to form a stack. The dielectric layers are preferably embodied as ceramic layers. Furthermore, the main body comprises first and second electrode layers arranged between the ceramic layers. By way of example, a first and a second electrode layer can in each case be arranged in a manner spaced apart from one another in an identical layer plane. Furthermore, the first and second electrode layers can in each case be arranged in different layer planes of the stack. The ceramic layers and the electrode layers are thus arranged along the stacking direction, wherein at least one ceramic layer is arranged between in each case two first or second electrode layers that are directly adjacent in the stacking direction. Preferably, the ceramic layers and the electrode layers arranged therebetween form a sintering body that can be produced by the sintering of ceramic green sheets to which the electrode layers are applied in the form of pastes and which are stacked one above another prior to the sintering.

In the stacking direction, the main body is delimited by outer surfaces which form an underside and a top side of the main body and the distance between which defines a height of the main body.

In accordance with a further embodiment, the main body has two outer sides which are situated opposite one another and which connect the top side and the underside of the main body to one another. The distance between the outer sides defines a length of the main body.

In accordance with a further embodiment, the main body has a first contact layer on the first outer side, the first contact layer being in electrical contact with the first electrode layers, while a second contact layer is applied on the second outer side, the second contact layer being in electrical contact with the second electrode layers. In particular, the first electrode layers are electrically contacted by the first contact layer, while the second electrode layers are electrically contacted by the second contact layer on the second outer side situated opposite the first outer side. The first electrode layers thus directly adjoin the first contact layer and are directly connected to the first contact layer, while the second electrode layers directly adjoin the second contact layer and are directly connected to the second contact layer.

The first electrode layers therefore extend as far as the first outer side and are preferably spaced apart from the second outer side, while the second electrode layers extend as far as the second outer side and are preferably spaced apart from the first outer side.

The first and second contact layers can comprise one or a plurality of individual layers, for example, one or a plurality of metal layers, which can comprise, for example, chromium, copper, gold and/or silver. The contact layers can be applied, for example, by sputtering on the outer sides of the main body. By way of example, the first and second contact layers in each case comprise at least one first sputtering layer, wherein the first sputtering layer is in each case in direct contact with the first or second electrode layers. Preferably, the first sputtering layers comprise chromium or consist of chromium. Furthermore, the first and second contact layers can in each case comprise a second sputtering layer, wherein the second sputtering layers are preferably applied directly on the first sputtering layers. The second sputtering layers preferably comprise copper or consist of copper. Furthermore, the first and second contact layers can in each case comprise a third sputtering layer, wherein the third sputtering layers are preferably applied directly on the second sputtering layers. The third sputtering layers preferably comprise gold or consist of gold. Alternatively, the third sputtering layers can also comprise silver or consist of silver. The sputtering layers can have, for example, a layer thickness of between 0.1 µm and 1.5 µm.

In accordance with a further embodiment, the main body has side surfaces which are different than the outer sides, the top side and the underside and which connect the top side and the underside and the outer sides to one another. The distance between the side surfaces defines a width of the main body.

The electrode layers in each case have a length along the length of the main body, a width along the width of the main body and a thickness along the height of the main body.

In accordance with a further embodiment, the ceramic multi-layer capacitor has a pronounced anomaly of the capacitance depending on the temperature. Here and hereinafter, temperature-dependent capacitance anomaly denotes the property of the ceramic material of the main body that the capacitance has a maximum in a specific temperature range. The capacitance anomaly and thus the capacitance maximum is preferably in the range of the operating temperature of the ceramic multi-layer capacitor, that is to say for instance in the range of greater than or equal to 25° C. and less than or equal to 150° C. Particularly preferably, the capacitance anomaly and thus the capacitance maximum is in the range of greater than or equal to 60° C. and less than or equal to 120° C.

In order to utilize the capacitance anomaly and operate the ceramic multi-layer capacitor at a temperature which is as near as possible to the temperature at which the capacitance has its maximum, the operating temperature of the ceramic multi-layer capacitor can be monitored and set by an external temperature controller, for example. Furthermore, it may also be possible, for example, to operate the ceramic multi-layer capacitor near another electrical or electronic component that is operated at a defined temperature corresponding to the desired operating temperature of the ceramic multi-layer capacitor.

In accordance with a further embodiment, the ceramic layers comprise a ceramic material on the basis of $BaTi_{1-y}Zr_yO_3$ where $0 \leq y \leq 1$. It has been found that such a material can have an above-described temperature-dependent capacitance anomaly in the desired temperature range. The ceramic material can furthermore, for example, also consist of the stated material, that is to say of $BaTi_{1-y}Zr_yO_3$ where $0 \leq y \leq 1$. In other words, in this case only pure $BaTi_{1-y}Zr_yO_3$ is used as ceramic material for the ceramic layers. Furthermore, it may also be possible for the ceramic material to comprise or to consist of $BaTi_{1-y}Zr_yO_3$ where $0<y<1$ and preferably where $0<y<0.3$.

In addition, the ceramic material of the ceramic layers can comprise one or a plurality of additives, for example, in the form of dopings. Such additives may preferably be suitable for shifting the capacitance anomaly and thus the capacitance maximum to higher or lower temperatures. By way of example, the ceramic material can comprise one or a plurality of metals selected from Pb, Ca, Sn, Sr, Bi, Hf and Nb. Such metals can be contained in particular as doping in the $BaTi_{1-y}Zr_yO_3$ and bring about a temperature shift of the capacitance anomaly.

Furthermore, the ceramic material of the ceramic layers can comprise one or a plurality of metals selected from Ni, Al, Mg, Fe, Cr and Mn. In particular, these metals can be present as doping in the $BaTi_{1-y}Zr_yO_3$-based ceramic material and bring about in particular an improvement in the loss factor.

Furthermore, the ceramic material can comprise one or a plurality of metals selected from Si, Al, B, Cu and Zn. These metals, too, can be present in particular as doping in the $BaTi_{1-y}Zr_yO_3$ and can lead to an improvement in the density and/or to a modification of the sintering temperature, the shrinkage behavior and/or the coefficient of thermal expansion of the ceramic layers.

In accordance with a further embodiment, the ceramic material comprises a solid solution or a mixture of different ceramic phases additionally comprising one or a plurality of the following materials:
- zirconates, silicates, titanates, aluminates, stannates, niobates, tantalates,
- oxides of the rare earths, in particular comprising one or more selected from Sc, Y, La, Ce, Pr, Nd,
- group 1A metal oxides, group 2A metal oxides,
- refractory oxides, in particular refractory metal oxides, for example, comprising Ti, V, Cr, Mn, Zr, Nb, Mo, Hf, Ta, W,
- metal oxides comprising Al, Si, Sn, Pb, Bi.

In addition to the choice of a suitable ceramic material in accordance with the description above, the choice of a suitable electrode layer configuration may prove to be advantageous for the ceramic multi-layer capacitor. In particular, configurations of the electrode layers such as are known for ceramic multi-layer capacitors (MLCC: "multi-layer ceramic capacitor") or ceramic multi-layer serial capacitors (MLSC: "multi-layer serial capacitor") may be advantageous.

By way of example, the first and second electrode layers can be arranged alternately one above another in the main body. Preferably, the first and second electrode layers can in this case be the sole electrode layers in the main body. A so-called "hammer design" has proved to be particularly advantageous, in which the electrode layers have a larger width in the region of the respectively contacted contact layer than in a region further away from the respectively contacted contact layers. In particular, the width of the electrode layers can in this case taper symmetrically in a step on both sides, such that the electrode layers have a hammer-like or T-like shape in a plan view along the stacking direction of the main body, wherein the wider part of the electrode layers contacts the respective contact layer.

In accordance with a further embodiment, the ceramic multi-layer capacitor comprises in the main body a plurality of third electrode layers that are not contacted by a contact layer. Such electrodes are also referred to as "floating" electrodes. The third electrode layers can overlap the first and/or the second electrode layers. Preferably, the third electrode layers overlap the first and the second electrode layers. In this case, "overlap" means that the third electrode layers in each case have at least one partial region which could be brought to congruence with at least one partial region of the first electrode layers and/or of the second electrode layers in a mental projection in the stacking direction of the main body.

In a further embodiment, the first and second electrode layers are arranged in each case in pairs in one plane. Between the planes having in each case a first and a second electrode layer, third electrode layers are present in the main body, which are not contacted externally and which are spaced apart from the outer sides and side surfaces and are thus "floating". In this case, the first and second electrode layers can also be spaced apart from the side surfaces of the main body. In other words, in this embodiment, all the electrode layers are embodied such that they are narrower than the main body. As an alternative thereto, it may also be possible for the third electrode layers to have a larger width than the first and second electrode layers. In particular, in this case the third electrode layers can extend as far as the side surfaces, while the first and second electrode layers are spaced apart from the side surfaces of the main body. In other words, in this case the first and second electrode layers have a smaller width than the main body, while the third electrode layers are of just the same width as the main body. Such an electrode layer configuration may be advantageous with the use of electrode materials comprising or composed of base metals since the electrode layers exposed toward the outside at the side surfaces allow a better reoxidation manifested in a higher insulation resistance.

In accordance with a further embodiment, the ceramic layers have a layer thickness of greater than or equal to 1 μm or greater than or equal to 5 μm or greater than or equal to 10 μm or greater than or equal to 20 μm and of less than or equal to 200 μm or less than or equal to 100 or less than or equal to 50 μm. In accordance with a further preferred embodiment, the ceramic layers have a layer thickness of between 10 μm and 50 μm. Particularly preferably, the ceramic layers have a layer thickness of approximately 25 μm.

In accordance with a further embodiment, the electrode layers have a layer thickness of greater than or equal to 0.5 μm and less than or equal to 2 μm. The electrode layers between the ceramic layers can comprise or be composed of a base metal, for example. By way of example, the electrode layers can comprise an Ni- and/or a Cu-based metal, that is to say consist of Ni or Cu or an alloy comprising Ni and/or comprising Cu or at least comprise a significant proportion of Ni and/or Cu.

In accordance with a further embodiment, the main body comprises at least 100 or at least 1000 ceramic layers with electrode layers arranged therebetween.

In accordance with a further embodiment, the main body has a volume of greater than or equal to 1 $cm^3$ or greater than or equal to 2 $cm^3$ or greater than or equal to 5 $cm^3$ or greater than or equal to 10 $cm^3$. In particular, the main body can have a volume of a few cubic centimeters or of a few tens of cubic centimeters. Furthermore, the ceramic multi-layer capacitor can also comprise a plurality of main bodies which are interconnected in series and/or in parallel with one another.

A ceramic multi-layer capacitor described here may be distinguished in particular by a combination of a high capacitance, a high energy density, a high breakdown voltage, a low ESR value and a low ESL value.

BRIEF DESCRIPTION OF THE DRAWINGS

Further advantages and advantageous embodiments of the ceramic multi-layer capacitor will become apparent from the embodiments described below in association with the figures.

In the figures.

In the exemplary embodiments and figures, identical or identically acting constituent parts may be provided in each case with the same reference signs. The illustrated elements and their size relationships among one another should not be regarded as true to scale, in principle. Rather, individual elements such as, for example, layers, component parts and regions may be illustrated with exaggerated thickness or size dimensions in order to enable better illustration and/or in order to afford a better understanding.

DETAILED DESCRIPTION OF ILLUSTRATIVE EMBODIMENTS

Figure 1:
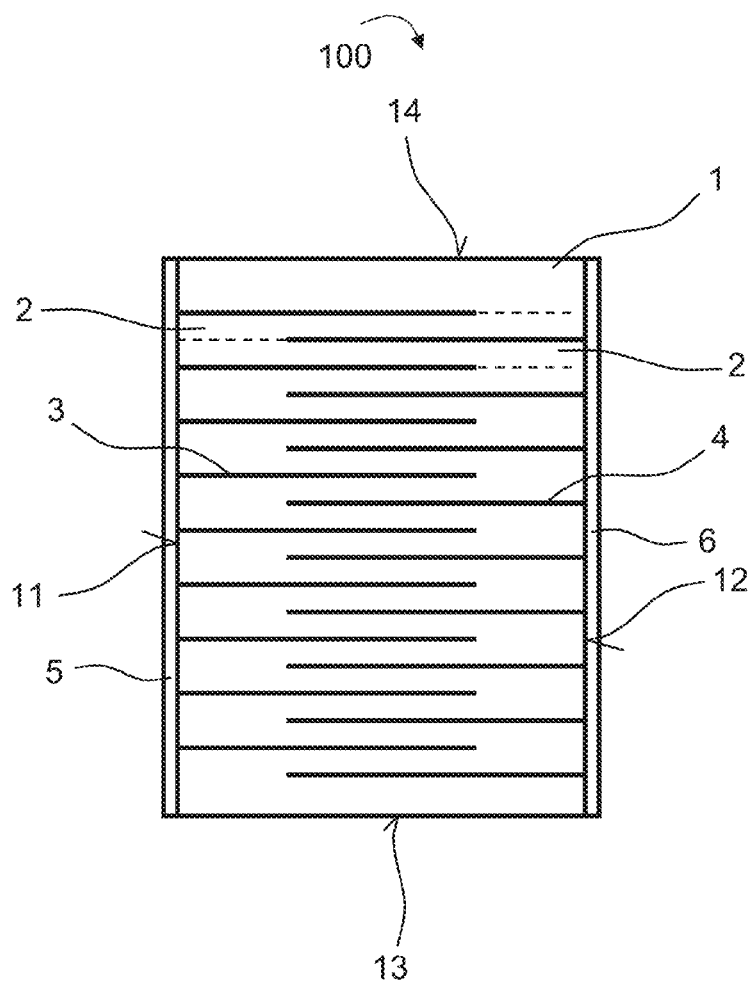
FIG. 1 shows a schematic sectional view of a ceramic multi-layer capacitor in accordance with one exemplary embodiment.

FIG. 1 shows a ceramic multi-layer capacitor 100 in accordance with one exemplary embodiment.

The ceramic multi-layer capacitor 100 comprises a main body 1 comprising ceramic layers 2 and first and second electrode layers 3, 4 arranged therebetween. The ceramic layers 2 are indicated with the aid of the dashed lines in the upper partial region of the main body 1. The main body 1 forms a sintering body in which the ceramic layers 2, prior to sintering in the form of green sheets, are printed with the electrode layers 3, 4 and stacked one above another. The electrode layer configuration shown corresponds to that of a customary multi-layer capacitor comprising first and second electrode layers 3, 4 which are stacked alternately one above another and which preferably overlap, as is shown in FIG. 1.

On a first outer side 11 of the main body 1, the ceramic multi-layer capacitor 100 comprises a first contact layer 5, which is in electrical contact with the first electrode layers 3, such that the first electrode layers 3 can be electrically contacted from outside by the first contact layer 5. Correspondingly, a second contact layer 6 is applied on a second outer side 12 situated opposite the first outer side 5, the second contact layer electrically contacting the second electrode layers 4. Along the stacking direction of the ceramic layers 2 and the electrode layers 3, 4, the main body 1 is delimited by an underside 13 and a top side 14 connected to one another by the outer sides 11, 12.

The main body 1 has a parallelepipedal shape having a length, a width and height. The length is given by the distance between the first and second outer sides 11, 12, the height is given by the distance between the underside 13 and the top side 14, and the width is given by the distance between mutually opposite side surfaces of the main body 1 which connect the outer sides 11, 12 and the top side 14 and the underside 13 of the main body 1 and which lie parallel to the plane of the drawing in the illustration shown.

The ceramic layers 2 comprise a ceramic material on the basis of $BaTi_{1-y}Zr_yO_3$ where $0 \leq y \leq 1$, preferably where $0 < y < 1$, and particularly preferably where $0 < y < 0.3$. Such a material can have a pronounced capacitance anomaly depending on the operating temperature of the ceramic multi-layer capacitor 100. In particular, the capacitance anomaly can be in a temperature range of greater than or equal to 25° C. and less than or equal to 150° C. and preferably of greater than or equal to 60° C. and less than or equal to 120° C. In order to be able to operate the ceramic multi-layer capacitor 100 with the highest possible capacitance, the operating temperature of the multi-layer capacitor 100 is correspondingly set to a value at which the capacitance anomaly is as pronounced as possible, that is to say at which the temperature-dependent capacitance of the ceramic material is in the region of a maximum or even has a maximum. In order to set the temperature of the ceramic multi-layer capacitor, the operating temperature can be regulated, for example, with aid of an external temperature controller. It is also possible to mount the multi-layer capacitor 100, for example, in proximity to or near another component that operates at a suitable temperature.

The ceramic material $BaTi_{1-y}Zr_yO_3$ can be present in the ceramic layers in pure form, i.e. as far as possible without contamination and in particular also without dopants, or in a form doped with further elements. In particular, therefore, the ceramic material of the ceramic layers can consist of $BaTi_{1-y}Zr_yO_3$ where $0 \leq y \leq 1$, wherein preferably also $0 < y < 1$ and particularly preferably $0 < y < 0.3$ can hold true.

Furthermore, the ceramic material can comprise materials, in particular metals, which can shift the capacitance anomaly, that is to say the capacitance maximum, in the direction of higher or low temperatures, such as, for example, Pb, Ca, Sn, Sr, Bi, Hf, Nb or similar or combinations therewith. Furthermore, the ceramic material can also contain elements which can improve the loss factor, such as, for example, Ni, Al, Mg, Fe, Cr, Mn or similar or combinations thereof. In order to improve the density of the ceramic layers and/or in order to modify the sintering temperature, the shrinkage behavior and/or the coefficient of thermal expansion, the ceramic material can also comprise elements such as, for example, Si, Al, B, Cu, Zn or similar or combinations thereof. The stated materials can be present in particular in the form of dopants in the ceramic material of the ceramic layers.

Furthermore, the ceramic material of the ceramic layers 2 can comprise a solid solution or a mixture of different ceramic phases comprising one or a plurality of the following materials:

zirconates, silicates, titanates, aluminates, stannates, niobates, tantalates, oxides of the rare earths, in particular comprising Sc, Y, La, Ce, Pr, Nd, group 1A metal oxides, group 2A metal oxides, refractory oxides, for example, refractory metal oxides, in particular comprising Ti, V, Cr, Mn, Zr, Nb, Mo, Hf, Ta, W, metal oxides comprising Al, Si, Sn, Pb, Bi.

The electrode layers 3, 4 comprise Ni-based and/or Cu-based metals and have a thickness in the range of greater than or equal to 0.5 µm and less than or equal to 2 µm. The ceramic layers 2 preferably have a thickness in the range of greater than or equal to 1 µm and less than or equal to 2 µm. It is particularly advantageous if the ceramic multi-layer capacitor 100 comprises as main body 1 at least 100 and preferably at least 1000 ceramic layers 2 with electrode layers arranged therebetween. In particular, the ceramic multi-layer capacitor 100 can comprise a main body 1 having a volume of a few cubic centimeters. It may also be possible for the ceramic multi-layer capacitor 100 to comprise a plurality of the main bodies 1 described, which are interconnected with one another in series or in parallel or a combination thereof.

Figure 2:
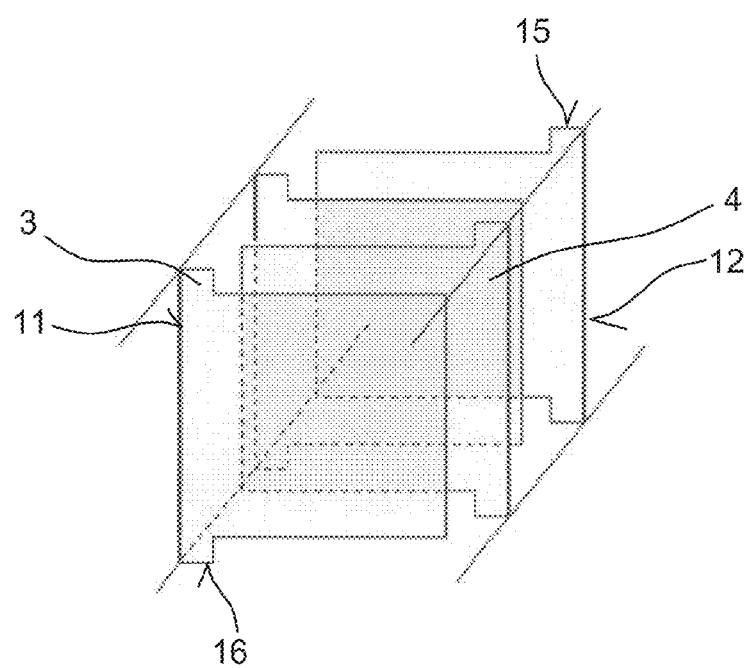
FIGS. 2 to 4 show schematic three-dimensional illustrations of electrode layer configurations in accordance with further exemplary embodiments.

In the case of the electrode layer configuration shown in FIG. 1 with mutually overlapping first and second electrode layers 3 and 4 arranged alternately one above another, in particular a so-called hammer design is advantageous, as is shown in a three-dimensional schematic drawing in FIG. 2. In this case, the first electrode layers 3 have a wide part in contact with the first outer side 11 and thus with the first contact layer 5 (not shown), the width tapering symmetrically in a step in a direction directed away from the first contact layer 5. In particular, it may advantageous if the wide part of the first electrode layers 3 has the width of the main body 1 and thus adjoins the side surfaces 15, 16 of the main body 1. The second electrode layers 4 are embodied correspondingly and have a wide part in contact with the second outer side 12 and thus in contact with the second contact layer 6 (not shown), while the width tapers symmetrically in a step in a direction directed away from the second contact layer 6.

As an alternative to such an electrode layer configuration, the ceramic multi-layer capacitor 100 can also have an electrode layer configuration which is known from ceramic multi-layer serial capacitors and which has buried third electrode layers 7 within the main body 1, which form a serial connection between individual units with first and second electrode layers 3, 4. Such configurations are shown in FIGS. 3 and 4.

Figure 3:
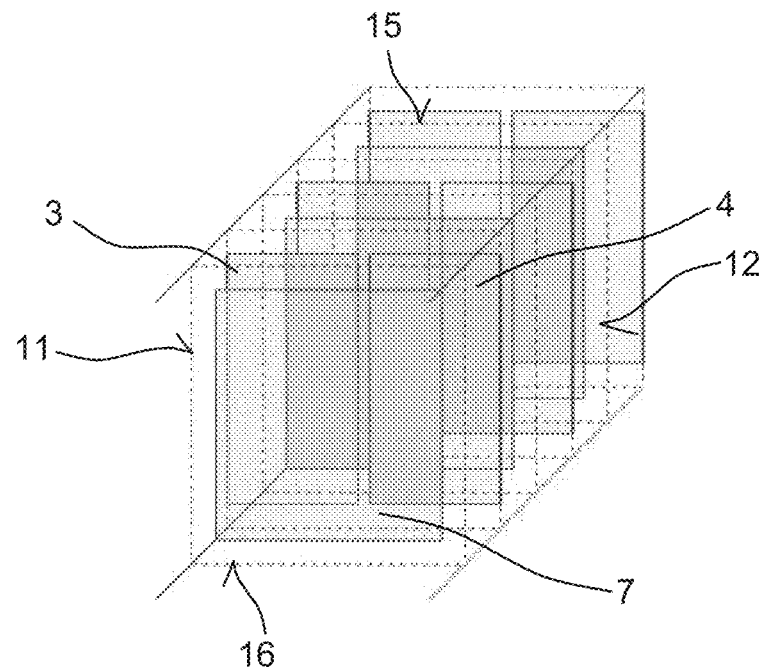
Figure 4:
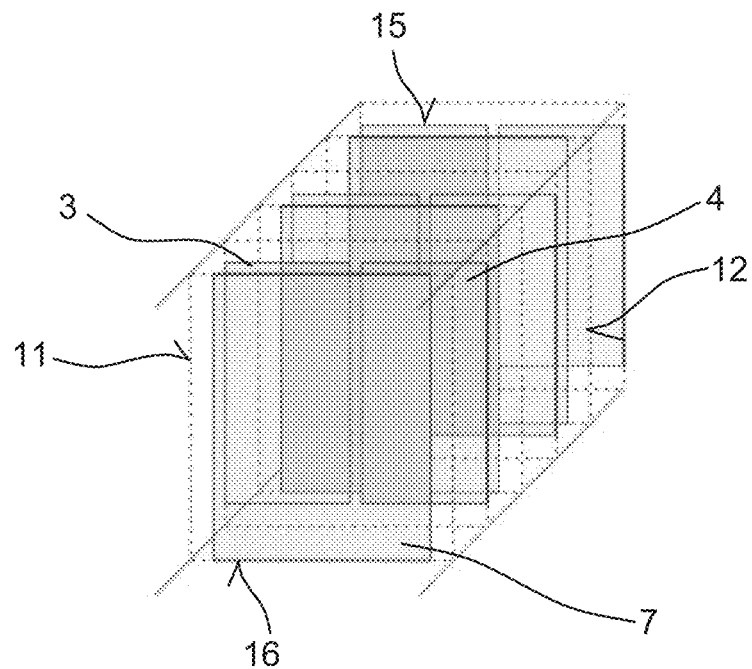

FIG. 3 shows a configuration in which the first and second electrode layers 3, 4 are arranged in each case in pairs in one plane, while between the planes third electrode layers 7 are present in the main body, which are not externally contacted and which are spaced apart from the outer sides 11, 12 and the side surfaces 15, 16. The third electrode layers 7 are thus embodied as "floating" electrodes. Furthermore, the first and second electrode layers 3, 4 can also be spaced apart from the side surfaces 15, 16.

As an alternative thereto, it may also be advantageous if the third electrode layers 7 have a larger width than the first and second electrode layers 3, 4 and in particular in comparison with the first and second electrode layers 3, 4, which are spaced apart from the side surfaces 15, 16, extend as far as the side surfaces 15, 16. Particularly in conjunction with electrode layer materials on the basis of base metals, such an electrode layer configuration can allow a better reoxidation manifested in a higher insulation resistance.

Figure 5:
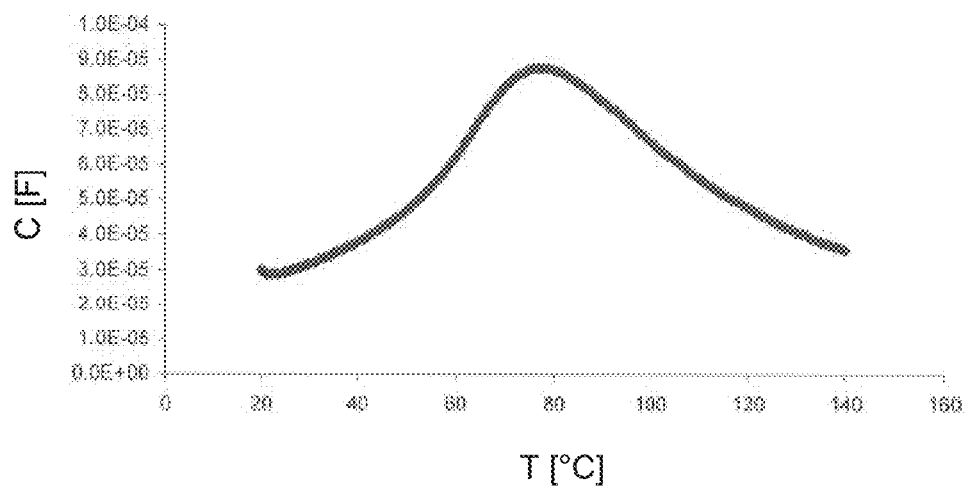
FIGS. 5 and 6 show electrical properties of a ceramic multi-layer capacitor in accordance with a further exemplary embodiment.
Figure 6:
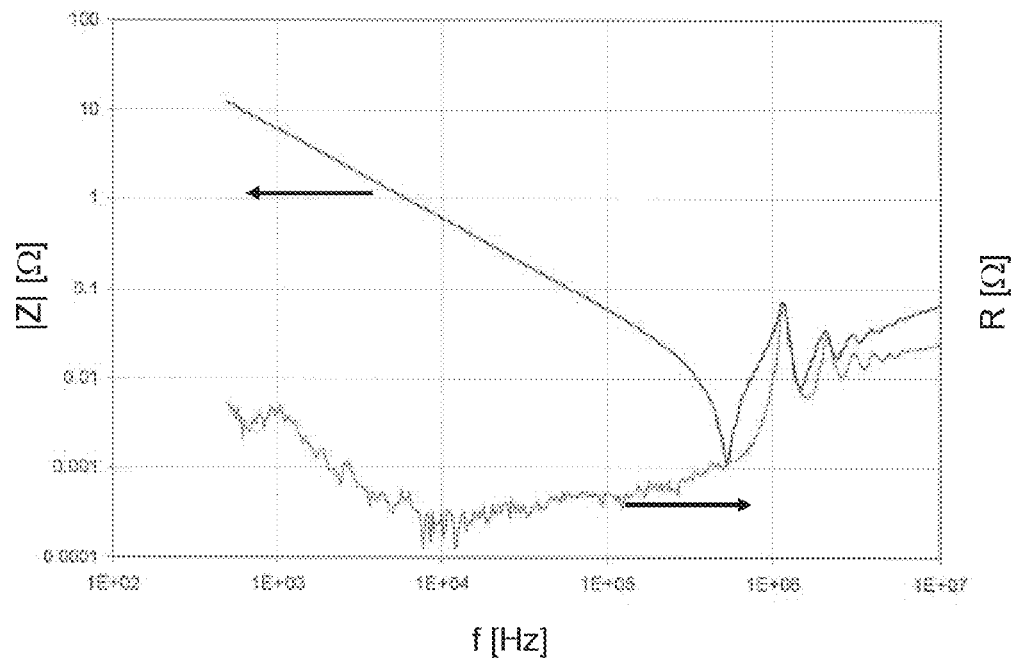

FIGS. 5 and 6 show electrical properties of a ceramic multi-layer capacitor in accordance with the above description, the capacitor having a size of 6×32×36 mm³. In this case, the ceramic layers have a thickness of 26 µm. The main body is formed from 1200 ceramic layers and nickel electrode layers arranged therebetween. The contact layers forming the external electrodes of the multi-layer capacitor are applied by sputtering as described in the general part. FIG. 5 shows the capacitance C in F as a function of the temperature T in ° C. The capacitance was measured at a voltage of 0.1 V and a frequency of 100 Hz. It can readily be discerned that the capacitance C has a pronounced capacitance anomaly with a capacitance maximum in the region of 80° C. Thus, the preferred operating temperature of the multi-layer capacitor is approximately 80° C. FIG. 6 depicts the impedance of the multi-layer capacitor as a function of the frequency F in Hz, the figure showing the magnitude of the complex impedance Z and the real part R in each case in Ω. Furthermore, the multi-layer capacitor described has the present electrical properties at room temperature:

ESR: 1.11 mΩ
ESL: 3.5 nH
R, min: 0.12 mΩ
C (at 1 kHz): 26.0 µF
Loss factor (at 1 kHz): 0.07%
Breakdown voltage: 1.2 kV
Energy density (at 500 V and 80° C.): 0.7 J cm$^{-3}$
Capacitance density (at 80° C.): 13.4 µF cm$^{-3}$ Consequently, the ceramic multi-layer capacitor described here has excellent properties on account of a combination of a high capacitance and high energy density, a high breakdown voltage, low ESR and low ESL.

The exemplary embodiments described in figures can alternatively or additionally have further features in accordance with the description in the general part, even if these are not explicitly described in association with the figures.

The invention is not restricted to the exemplary embodiments by the description on the basis of said exemplary embodiments, but rather encompasses any novel feature and also any combination of features. This includes in particular any combination of features in the patent claims, even if this feature or this combination itself is not explicitly specified in the patent claims or exemplary embodiments.

The invention claimed is:

1. A ceramic multi-layer capacitor comprising a main body comprising ceramic layers and first and second electrode layers arranged therebetween, wherein the ceramic layers comprise a ceramic material on a basis of $BaTi_{1-y}Zr_yO_3$ where 0≤y≤1, which has a temperature-dependent capacitance anomaly.

2. The multi-layer capacitor according to claim 1, wherein the ceramic material comprises $BaTi_{1-y}Zr_yO_3$ where 0<y<1.

3. The multi-layer capacitor according to claim 2, wherein the ceramic material comprises $BaTi_{1-y}Zr_yO_3$ where 0<y<0.3.

4. The multi-layer capacitor according to claim 1, wherein the ceramic material comprises one or a plurality of metals selected from Pb, Ca, Sn, Sr, Bi, Hf and Nb.

5. The multi-layer capacitor according to claim 1, wherein the ceramic material comprises one or a plurality of metals selected from Ni, Al, Mg, Fe, Cr and Mn.

6. The multi-layer capacitor according to claim 1, wherein the ceramic material comprises one or a plurality of metals selected from Si, Al, B, Cu and Zn.

7. The multi-layer capacitor according to claim 1, wherein the ceramic material comprises a solid solution or a mixture of different ceramic phases further comprising one or a plurality of the following materials:

zirconates, silicates, titanates, aluminates, stannates, niobates, tantalates,
oxides of rare earths comprising Sc, Y, La, Ce, Pr, Nd,
group 1A metal oxides, group 2A metal oxides,
refractory metal oxides, in particular comprising Ti, V, Cr, Mn, Zr, Nb, Mo, Hf, Ta, W, and
metal oxides comprising Al, Si, Sn, Pb, Bi.

8. The multi-layer capacitor according to claim 1, wherein the ceramic material consists of $BaTi_{1-y}Zr_yO_3$ where 0≤y≤1.

9. The multi-layer capacitor according to claim 1, wherein the capacitance anomaly is in a temperature range of greater than or equal to 25° C. and less than or equal to 150° C.

10. The multi-layer capacitor according to claim 1, wherein the capacitance anomaly is in a temperature range of greater than or equal to 60° C. and less than or equal to 120° C.

11. The multi-layer capacitor according to claim 1, wherein the first and second electrode layers comprise a base metal.

12. The multi-layer capacitor according to claim 11, wherein the first and second electrode layers comprise an Ni-based or a Cu-based metal.

13. The multi-layer capacitor according to claim 1, wherein the ceramic material comprises one or a plurality of metals selected from Pb, Sn, Sr, Bi, Hf and Nb and a solid solution or a mixture of different ceramic phases further comprising one or a plurality of the following materials:
zirconates, silicates, stannates, niobates, tantalates,
an oxide comprising Sc,
refractory metal oxides comprising Zr, Nb, Mo, Hf, Ta, and
metal oxides comprising Sn, Pb, Bi.

14. The multi-layer capacitor according to claim 1, wherein the ceramic layers have a thickness of greater than or equal to 1 μm and less than or equal to 200 μm.

15. The multi-layer capacitor according to claim 1, wherein the first and second electrode layers have a thickness of greater than or equal to 0.5 μm and less than or equal to 2 μm.

16. The multi-layer capacitor according to claim 1, wherein the main body comprises at least moo ceramic layers with electrode layers arranged therebetween.

17. The multi-layer capacitor according to claim 1, wherein the temperature-dependent capacitance anomaly includes a capacitance that has a maximum in a temperature range.

18. A ceramic multi-layer capacitor comprising a main body comprising ceramic layers and first and second electrode layers arranged therebetween, wherein the ceramic layers comprise a ceramic material on a basis of $BaTi_{1-y}Zr_yO_3$ where $0 \leq y \leq 1$, which has a temperature-dependent capacitance anomaly, and wherein the main body has a volume of greater than or equal to 1 $cm^3$.

19. A ceramic multi-layer capacitor comprising a main body comprising ceramic layers and first and second electrode layers arranged therebetween, wherein the ceramic layers comprise a ceramic material on a basis of $BaTi_{1-y}Zr_yO_3$ where $0 \leq y \leq 1$, which has a temperature-dependent capacitance anomaly,
wherein the first electrode layers are electrically contacted by a first contact layer on a first outer side of the main body and the second electrode layers are electrically contacted by a second contact layer on a second outer side of the main body, the second outer side being situated opposite the first outer side,
wherein the main body has a length, a width and a height and the length is given by a first distance between the first and second outer sides, the height is given by a second distance between an underside of the main body and a top side of the main body along a stacking direction of the ceramic layers and the first and second electrode layers, and the width is given by a third distance between mutually opposite side surfaces of the main body which connect the outer sides and the top side and the underside of the main body,
wherein the first and second electrode layers are arranged alternately one above another in the main body and, in each case, have a width which tapers symmetrically in a step in a direction directed away from the respective contact layer, and
wherein the first and second electrode layers are arranged, in each case, in pairs in one plane and between the planes, third electrode layers are present in the main body, the third electrode layers being not externally contactable and being, in each case, spaced apart from the outer sides and side surfaces.

20. A ceramic multi-layer capacitor comprising a main body comprising ceramic layers and first and second electrode layers arranged therebetween, wherein the ceramic layers comprise a ceramic material on a basis of $BaTi_{1-y}Zr_yO_3$ where $0 \leq y \leq 1$, which has a temperature-dependent capacitance anomaly,
wherein the first electrode layers are electrically contacted by a first contact layer on a first outer side of the main body and the second electrode layers are electrically contacted by a second contact layer on a second outer side of the main body, the second outer side being situated opposite the first outer side,
wherein the main body has a length, a width and a height and the length is given by a first distance between the first and second outer sides, the height is given by a second distance between an underside of the main body and a top side of the main body along a stacking direction of the ceramic layers and the first and second electrode layers, and the width is given by a third distance between mutually opposite side surfaces of the main body which connect the outer sides, the top side and the underside of the main body,
wherein the first and second electrode layers are arranged, in each case, in pairs in one plane and between the planes, third electrode layers are present in the main body, the third electrode layers being not externally contactable, being spaced apart from the outer sides and having a larger width than the first and second electrode layers, and
wherein the first and second electrode layers are spaced apart from the side surfaces and the third electrode layers extend as far as the side surfaces.

21. A ceramic multi-layer capacitor comprising a main body comprising ceramic layers and first and second electrode layers arranged therebetween, wherein the ceramic layers comprise a ceramic material on a basis of $BaTi_{1-y}Zr_yO_3$ where $0 \leq y \leq 1$, which has a temperature-dependent capacitance anomaly,
wherein the ceramic material comprises one or more metals selected from Pb, Sn, Bi, Hf, Nb, Ni, Al, Fe, B, Cu and Zn, and
wherein the ceramic material comprises a solid solution or a mixture of different ceramic phases further comprising one or more of the following materials:
zirconates, silicates, titanates, aluminates, stannates, niobates, tantalates,
oxides of one or more selected from Sc, La, Ce, Pr and Nd,
refractory metal oxides comprising one or more selected from Ti, Zr, Nb, Hf and Ta,
metal oxides comprising one or more selected from Al, Sn, Pb, and Bi.

22. A ceramic multi-layer capacitor comprising a main body comprising ceramic layers and first and second electrode layers arranged therebetween, wherein the ceramic layers comprise a ceramic material on a basis of $BaTi_{1-y}Zr_yO_3$ where $0 \leq y \leq 1$, which has a temperature-dependent capacitance anomaly, and wherein the ceramic material comprises one or more metals selected from Pb, Sn, Sr, Bi, Hf and Nb and a solid solution or a mixture of different ceramic phases further comprising one or more of the following materials:

zirconates, silicates, stannates, niobates, tantalates, an oxide comprising Sc, refractory metal oxides comprising one or more selected from Zr, Nb, Mo, Hf, and Ta, and metal oxides comprising one or more selected from Sn, Pb, and Bi.

* * * * *

UNITED STATES PATENT AND TRADEMARK OFFICE
CERTIFICATE OF CORRECTION

| | | |
|---|---|---|
| PATENT NO. | : 9,583,268 B2 | Page 1 of 1 |
| APPLICATION NO. | : 14/912272 | |
| DATED | : February 28, 2017 | |
| INVENTOR(S) | : Andrea Testino | |

It is certified that error appears in the above-identified patent and that said Letters Patent is hereby corrected as shown below:

In the Claims

In Column 8, Line 63, Claim 7, delete ", in particular".

In Column 9, Line 33, Claim 16, delete "moo" and insert --1000--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*